United States Patent
Colijn et al.

(10) Patent No.: US 9,733,096 B2
(45) Date of Patent: Aug. 15, 2017

(54) DETERMINING PICKUP AND DESTINATION LOCATIONS FOR AUTONOMOUS VEHICLES

(71) Applicant: Waymo LLC, Mountain View, CA (US)

(72) Inventors: Peter Colijn, San Francisco, CA (US); Joshua Seth Herbach, San Francisco, CA (US); Matthew Paul McNaughton, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 14/745,799

(22) Filed: Jun. 22, 2015

(65) Prior Publication Data

US 2016/0370194 A1    Dec. 22, 2016

(51) Int. Cl.
*G01C 21/34* (2006.01)
*G08G 1/00* (2006.01)

(52) U.S. Cl.
CPC .......... *G01C 21/34* (2013.01); *G01C 21/343* (2013.01); *G08G 1/202* (2013.01)

(58) Field of Classification Search
CPC ............ G01C 21/3617; G01C 21/3438; G01C 21/3476; G08G 1/202
USPC ........ 701/461, 538, 400, 409, 23; 705/14.58
See application file for complete search history.

(56) References Cited

U.S. PATENT DOCUMENTS

| | | | |
|---|---|---|---|
| 4,361,202 A | 11/1982 | Minovitch | |
| 4,465,155 A | 8/1984 | Collins | |
| 5,293,160 A | 3/1994 | Kurozu et al. | |
| 5,367,456 A | 11/1994 | Summerville et al. | |
| 5,640,323 A | 6/1997 | Kleimenhagen et al. | |
| 6,236,333 B1 | 5/2001 | King | |
| 6,298,304 B1 | 10/2001 | Theimer | |

(Continued)

FOREIGN PATENT DOCUMENTS

| | | |
|---|---|---|
| EP | 2573720 A1 | 3/2013 |
| EP | 2629269 A1 | 8/2013 |

(Continued)

OTHER PUBLICATIONS

Junqing Wei et al., "Towards a viable autonomous driving research platform", In: Intelligent Vehicles Symposium (IV), 2013 IEEE, Jun. 23-26, 2013, pp. 763-770.

(Continued)

*Primary Examiner* — Marthe Marc-Coleman
(74) *Attorney, Agent, or Firm* — Lerner, David, Littenberg, Krumholz & Mentlik, LLP

(57) ABSTRACT

Aspects of the disclosure provide systems and methods for providing suggested locations for pick up and destination locations. Pick up locations may include locations where an autonomous vehicle can pick up a passenger, while destination locations may include locations where the vehicle can wait for an additional passenger, stop and wait for a passenger to perform some task and return to the vehicle, or for the vehicle to drop off a passenger. As such, a request for a vehicle may be received from a client computing device. The request may identify a first location. A set of one or more suggested locations may be selected by comparing the predetermined locations to the first location. The set may be provided to the client computing device.

20 Claims, 12 Drawing Sheets

(56) References Cited

U.S. PATENT DOCUMENTS

| | | | |
|---|---|---|---|
| 6,591,172 B2 | 7/2003 | Oda et al. | |
| 6,680,675 B1* | 1/2004 | Suzuki | G01C 21/34 |
| | | | 340/539.13 |
| 6,963,794 B2 | 11/2005 | Geber et al. | |
| 7,113,864 B2 | 9/2006 | Smith et al. | |
| 7,859,386 B2 | 12/2010 | Lundkvist | |
| 7,928,829 B2 | 4/2011 | Hermann | |
| 8,044,771 B2 | 10/2011 | Nakajima et al. | |
| 8,126,450 B2 | 2/2012 | Howarter et al. | |
| 8,352,112 B2 | 1/2013 | Mudalige | |
| 8,494,765 B2 | 7/2013 | Konet et al. | |
| 8,532,862 B2 | 9/2013 | Neff | |
| 8,676,430 B1 | 3/2014 | Ferguson et al. | |
| 8,688,306 B1 | 4/2014 | Nemec et al. | |
| 8,718,861 B1 | 5/2014 | Montemerlo et al. | |
| 8,736,438 B1 | 5/2014 | Vasquez et al. | |
| 8,768,565 B2 | 7/2014 | Jefferies et al. | |
| 8,880,270 B1 | 11/2014 | Ferguson et al. | |
| 8,935,034 B1 | 1/2015 | Zhu et al. | |
| 9,060,003 B2 | 6/2015 | Wang et al. | |
| 9,191,514 B1* | 11/2015 | Cavanaugh | H04M 11/00 |
| 2004/0036622 A1 | 2/2004 | Dukach et al. | |
| 2004/0249569 A1* | 12/2004 | Oh | G01C 21/34 |
| | | | 701/533 |
| 2004/0260470 A1 | 12/2004 | Rast | |
| 2006/0253251 A1* | 11/2006 | Puranik | G01C 21/3608 |
| | | | 701/431 |
| 2007/0073472 A1 | 3/2007 | Odinak et al. | |
| 2007/0073552 A1 | 3/2007 | Hileman | |
| 2008/0061931 A1 | 3/2008 | Hermann | |
| 2008/0136674 A1 | 6/2008 | Jang et al. | |
| 2008/0195428 A1 | 8/2008 | O'Sullivan | |
| 2008/0266139 A1 | 10/2008 | Kim | |
| 2008/0312817 A1* | 12/2008 | Kawauchi | G01C 21/3611 |
| | | | 701/533 |
| 2009/0171566 A1 | 7/2009 | Morimoto et al. | |
| 2009/0187538 A1* | 7/2009 | Grun | G01C 21/32 |
| 2009/0216600 A1 | 8/2009 | Hill | |
| 2009/0287367 A1 | 11/2009 | Salinger | |
| 2010/0007525 A1 | 1/2010 | Shanbhag et al. | |
| 2010/0017084 A1 | 1/2010 | Riegel | |
| 2010/0070168 A1 | 3/2010 | Sumcad et al. | |
| 2010/0075656 A1 | 3/2010 | Howarter et al. | |
| 2010/0106397 A1* | 4/2010 | Van Essen | G06F 17/30241 |
| | | | 701/532 |
| 2010/0117585 A1 | 5/2010 | Fitch et al. | |
| 2010/0183409 A1 | 7/2010 | Checketts et al. | |
| 2010/0256836 A1 | 10/2010 | Mudalige | |
| 2010/0284771 A1 | 11/2010 | Stierler | |
| 2010/0286845 A1 | 11/2010 | Rekow et al. | |
| 2011/0099040 A1 | 4/2011 | Felt et al. | |
| 2011/0112969 A1 | 5/2011 | Zaid et al. | |
| 2011/0144865 A1 | 6/2011 | Niemz | |
| 2011/0144980 A1 | 6/2011 | Rysenga | |
| 2011/0191019 A1* | 8/2011 | Holsinger | G01C 21/00 |
| | | | 701/533 |
| 2011/0301985 A1 | 12/2011 | Camp et al. | |
| 2012/0041675 A1 | 2/2012 | Juliver et al. | |
| 2012/0072051 A1 | 3/2012 | Koon et al. | |
| 2012/0083960 A1 | 4/2012 | Zhu et al. | |
| 2012/0173080 A1 | 7/2012 | Cluff | |
| 2012/0188100 A1 | 7/2012 | Min et al. | |
| 2012/0271500 A1 | 10/2012 | Tsimhoni et al. | |
| 2013/0024049 A1 | 1/2013 | Yoshioka et al. | |
| 2013/0231824 A1 | 9/2013 | Wilson et al. | |
| 2013/0238783 A1* | 9/2013 | Alexander | G06F 17/30873 |
| | | | 709/224 |
| 2013/0289825 A1 | 10/2013 | Noh et al. | |
| 2013/0321178 A1 | 12/2013 | Jameel et al. | |
| 2014/0135598 A1 | 5/2014 | Weidl et al. | |
| 2014/0156182 A1 | 6/2014 | Nemec et al. | |
| 2014/0172292 A1* | 6/2014 | McGee | G01C 21/3608 |
| | | | 701/418 |
| 2014/0172727 A1 | 6/2014 | Abhyanker et al. | |
| 2014/0189096 A1* | 7/2014 | Miller | G01C 21/3438 |
| | | | 709/224 |
| 2014/0365250 A1* | 12/2014 | Ikeda | G06Q 50/30 |
| | | | 705/5 |
| 2014/0380424 A1 | 12/2014 | Thompson | |
| 2015/0073645 A1 | 3/2015 | Davidsson et al. | |
| 2015/0127191 A1 | 5/2015 | Misra et al. | |
| 2015/0148989 A1 | 5/2015 | Cooper et al. | |
| 2015/0149320 A1* | 5/2015 | Smirin | G06Q 20/14 |
| | | | 705/26.8 |
| 2015/0185034 A1 | 7/2015 | Abhyanker | |
| 2015/0219464 A1* | 8/2015 | Beaurepaire | G01C 21/3617 |
| | | | 701/538 |
| 2015/0321641 A1 | 11/2015 | Abou Mahmoud et al. | |
| 2015/0324708 A1 | 11/2015 | Skipp et al. | |
| 2015/0334187 A1 | 11/2015 | Pesola et al. | |
| 2015/0338849 A1* | 11/2015 | Nemec | G05D 1/0055 |
| | | | 701/25 |
| 2015/0339928 A1 | 11/2015 | Ramanujam | |
| 2015/0369621 A1* | 12/2015 | Abhyanker | G01C 21/36 |
| | | | 701/461 |
| 2015/0370251 A1 | 12/2015 | Siegel et al. | |
| 2016/0019790 A1* | 1/2016 | Tobolski | G06Q 10/02 |
| | | | 340/932.2 |
| 2016/0027307 A1 | 1/2016 | Abhyanker et al. | |
| 2016/0116293 A1 | 4/2016 | Grover et al. | |
| 2016/0125735 A1* | 5/2016 | Tuukkanen | G08G 1/09 |
| | | | 701/23 |
| 2016/0203377 A1 | 7/2016 | Irie et al. | |

FOREIGN PATENT DOCUMENTS

| | | |
|---|---|---|
| JP | 2001234653 A | 8/2001 |
| WO | 03080391 A2 | 10/2003 |

OTHER PUBLICATIONS

International Search Report and Written Opinion for Application No. PCT/US2015/032171 dated Sep. 17, 2015.

Fagnant et al., "The travel and environmental implications of shared autonomous vehicles, using agent-based model scenarios", Transportation Research Part C, vol. 40 (2014): 1-13 (the attached reference includes 22 pages).

McFadden, Colin-Druce, "Autonomous car concept swaps steering wheel for gesture controls", <http://www.dvice.com/2014-3-12/autonomous-car-concept-swaps-steering-wheel-gesture-controls>, Mar. 12, 2014.

Ridden, Paul, "ATNMBL—The concept car with no steering wheel, brake pedal or driver's seat", <http://www.gizmag.com/atnmbl-autonomous-concept-passenger-transport/15877/>, Jul. 29, 2010.

Ranoa, "Infographic: The car that drives itself", Los Angeles Times, copyright 2014,<http://www.latimes.com/la-sci-g-google-self-driving-car-20140528-htmlstory.html>.

McKeegan, "Autonomous taxi can be hailed with and iPad app", Oct. 14, 2010, downloaded from <http://www.gizmag.com/autonomous-taxi-ipad/16649/>.

Baydere et al., "MR 302: The Future of the Automobile: Car-Sharing Service using Autonomous Automobiles" Spring 2014.

Bluetooth® Keyless, "FAQs about the Bluetooth® Passive Keyless Entry Module", copyright 2014, downloaded from <http://bluetoothkeyless.info/bluetooth-keyless-information/>.

Chevrolet, "OnStar Remote Link™: Control you Chevy even when you're not driving", 2014 downloaded from <http://www.chevrolet.com/onstar-remotelink.html>.

Goodwin, "Add-on module auto-unlocks your car when your phone is near", cInet, Nov. 19, 2013, downloaded from <http://www.cnet.com/news/add-on-module-auto-unlocks-your-car-when-your-phone-is-near/>.

International Search Report and Written Opinion for Application No. PCT/US2015/032181 dated Sep. 4, 2015.

International Search Report and Written Opinion for PCT Application No. PCT/US2016/035977, dated Sep. 29, 2016.

\* cited by examiner

DETERMINING PICKUP AND DESTINATION LOCATIONS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

BRIEF SUMMARY

One aspect of the disclosure provides a system. The system may include memory storing detailed map information identifying a plurality of predetermined locations where a vehicle is able to pick up or drop off passengers. The system may also include one or more server computers each having one or more processors. The one or more server computers may be configured to: receive a request from a client computing device, the request identifying a first location; select a set of one or more suggested locations by comparing the predetermined locations to the first location; and provide the set of one or more suggested locations to the client computing device.

In one example, the one or more server computers are configured to select the set of one or more suggested locations by determining whether the first location corresponds to a predetermined location, and when the first location corresponds to the predetermined location, including the predetermined location in the set. In another example, the one or more server computers are configured to select the set of one or more suggested locations by identifying predetermined locations of the plurality of predetermined location that are within a threshold distance of the first location. In another example, the threshold distance is defined as a walking distance. Alternatively, the threshold distance is defined as a radial distance. In addition, the one or more server computers are configured to select the set of one or more suggested locations by scoring each given one of the identified predetermined locations based on a first plurality of factors related to the difficulty in a person reaching that given one of the identified predetermined locations from the first location and the set of one or more suggested locations is also selected based upon the scoring of the identified predetermined locations.

In another example, the one or more server computers are configured to conduct the scoring of each given one of the identified predetermined locations also based on a second plurality of factors related to the difficulty in an autonomous vehicle reaching and stopping at that given one of the identified predetermined locations. In this example, the one or more server computers are also configured to determine at least one of the second plurality of factors based on a current location of the autonomous vehicle. In another example, the one or more server computers are configured to select the set of one or more suggested locations by identifying a set number of predetermined locations of the plurality of predetermined locations that are within a threshold distance of the first location and closest to the first location. In this example, the system also includes one or more autonomous vehicles, and wherein the one or more server computers are also configured to receive, from the client computing device, a selection of a suggested location of the set of one or more suggested locations and dispatch a vehicle of the one or more autonomous vehicles to the selected suggested location. In another example, the first location is a destination location and the one or more server computing devices are also configured to receive, from the client computing device, information confirming the first location as the destination location and provide instructions to a vehicle to drop off a passenger at the first location. In another example, the first location is a pick up location and the one or more server computing devices are also configured to receive, from the client computing device, information confirming the first location as the pickup location and dispatch a vehicle to the first location.

Another aspect of the disclosure provides a computer-implemented method. The method includes accessing, by one or more processors of one or more server computing devices, detailed map information identifying a plurality of predetermined locations where a vehicle is able to pick up or drop off passengers; receiving, by the one or more processors, a request from a client computing device, the request identifying a first location; selecting, by the one or more processors, a set of one or more suggested locations by comparing the predetermined locations to the first location and identifying predetermined locations of the plurality of predetermined locations that are within a threshold distance of the first location and closest to the first location; and providing, by the one or more processors, the set of one or more suggested locations to the client computing device.

In one example, selecting the set of one or more suggested locations includes determining whether the first location corresponds to a predetermined location, and when the first location corresponds to the predetermined location, including the predetermined location in the set. In another example, selecting the set includes selecting a predetermined number of predetermined locations of the plurality of predetermined locations that are within a threshold distance of the first location and closest to the first location. In this example, the threshold distance is defined as a walking distance. Alternatively, the threshold distance is defined as a radial distance. In addition, selecting the set of one or more suggested locations includes scoring each given one of the identified predetermined locations based on a first plurality of factors related to the difficulty in a person reaching that given one of the identified predetermined locations from the first location and using the scoring of the identified predetermined locations to select the set of one or more suggested locations. In this example, the scoring of each given one of the identified predetermined locations is conducted based on a second plurality of factors related to the difficulty in an autonomous vehicle reaching and stopping at that given one of the identified predetermined locations.

A further aspect of the disclosure provides a non-transitory, tangible, computer readable medium on which instructions are stored. The instructions, when executed by one or more processors, cause the one or more processors to perform a method. The method includes accessing detailed map information identifying a plurality of predetermined locations where a vehicle is able to pick up or drop off passengers; receiving a request from a client computing device, the request identifying a first location; selecting a set of one or more suggested locations by comparing the predetermined locations to the first location; scoring given ones of the plurality predetermined locations based on a first plurality of factors related to the difficulty in a person reaching a respective given one of the identified predetermined locations from the first location; providing the set of one or more suggested locations to the client computing device; and provide instructions to a vehicle to drop off a passenger at the first location.

DETAILED DESCRIPTION

OVERVIEW

Figure 1:
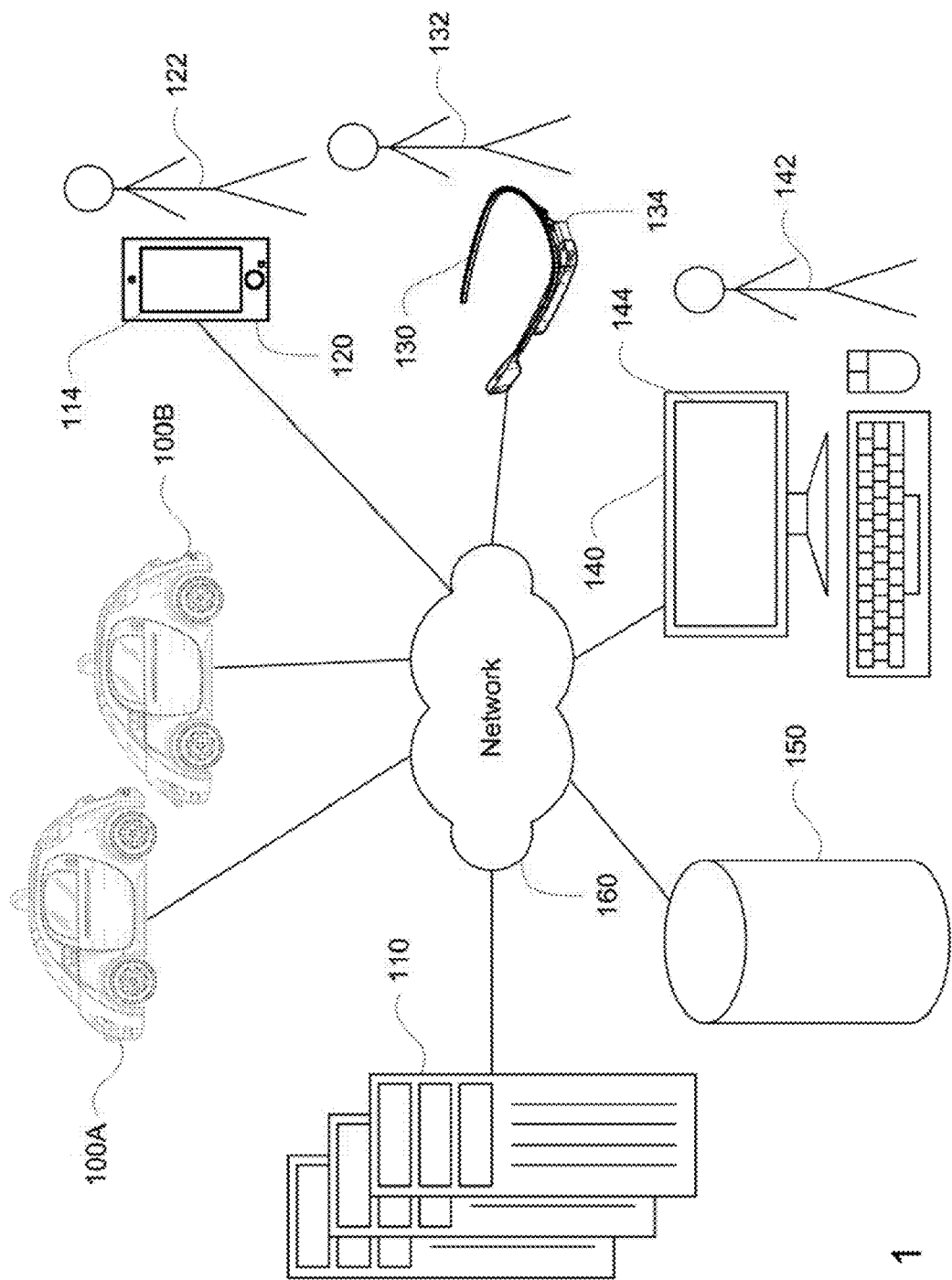
FIG. 1 is a pictorial diagram of an example system in accordance with an exemplary embodiment.

The technology relates to an autonomous vehicle service for maneuvering a user or passenger to a destination, for example taking a trip, autonomously. In order to do so, the user may provide a pickup location and one or more destination locations for the trip to a centralized dispatching system via a client computing device, such as a mobile phone. However, not all locations may be accessible or safe for a passenger pick up, for the vehicle to stop and wait for a passenger to perform some task and return to the vehicle, or for the vehicle to drop off a passenger. For example, autonomous vehicles may not be able to drive everywhere a human driven vehicle can. In addition, road conditions such as construction, emergency services activity, and speed limits (some may be too high for autonomous driving or picking up or dropping off passengers) can pose complications for autonomous vehicles and safety issues for picking up or dropping off passengers. To address this, when provided with a location, the centralized dispatching system may provide a set of one or more suggested locations corresponding to locations that an autonomous vehicle can pick up a passenger (pickup location) or locations where the vehicle can wait for an additional passenger, stop and wait for a passenger to perform some task and return to the vehicle, or for the vehicle to drop off a passenger (destination location). These suggested locations may include those provided by the user and/or convenient nearby locations. Thus, the features described herein may provide for increases in the availability, safety, and usefulness of the services of autonomous vehicles.

Pick up and destination locations may be identified in various ways. As an example, the pickup location can be defaulted to current location of the user's client computing device, but may also be a recent or saved location near the current location associated with the user's account. The user may enter an address or other location information, tap a location on a map, or select a location from a list in order to identify a pickup and/or destination location. The user's client computing device may send the location or locations to one or more server computing devices of the centralized dispatching system.

In order to provide suggestion in response, the one or more server computing devices may access detailed map information. The detailed map information may include information about roads, buildings, elevations, fire hydrants, construction zones, real time traffic conditions, etc. from various sources such as governmental institutions, paid informational services, manually entered information, information gathered and provided in real time by autonomous vehicles, etc. The detailed map information may also include information identifying predetermined locations where an autonomous vehicle can stop to pick up or drop off a passenger. These predetermined locations may include reasonable locations where a vehicle could stop selected manually or through some analysis of the characteristics of each location. The predetermined locations may also be limited to locations within a service area of the autonomous vehicle service.

Once a pickup or destination location is received, the one or more server computing devices may access the detailed map information to determine whether the received location corresponds to one of the predetermined locations. If so, the one or more server computing devices may determine that the received location is in fact reachable.

The one or more server computing devices may then provide a notification to the client computing device including a suggested location corresponding to the received location. The user may then approve or select the returned suggested location as a pick up or destination location and initiate (or continue as the case may be) a trip. If the location is a pickup location, the server may then dispatch a vehicle to the selected location to pick up the user for a trip.

When the received location does not correspond to one of the predetermined locations, the one or more server computing devices may use the detailed map information to identify a set of predetermined locations within a threshold distance of the received location. The threshold distance may be defined as a predetermined radial or walking distance from the received location and may also be adjusted by a user. For example, a default threshold distance may be 500 feet, or more or less, radially or in walking distance from a particular location. A user may then use his or her client computing device to adjust this value up or down and any adjustments may be provided to the one or more server computing devices by the user's client computing device.

For example, this set may include all of the predetermined locations within the threshold distance, or the one or more predetermined locations up to a maximum, within the threshold distance, that are closest to the received location. This set may then be provided to the client computing devices as a set of suggested locations for the user. In some examples, the set may be empty and the user provided with a notification that the received location is unavailable.

In one example, rather than returning all of the predetermined locations in the set, one or more predetermined locations may be selected for and returned as a set of suggested locations to the user. For example, each predetermined location within the set may be scored using various factors and the one or more highest (or lowest depending upon scale) scoring locations may be returned as suggested locations to the user.

In addition, as discussed in detail below, the features described herein allow for various alternatives.

Example Systems

Figure 2:
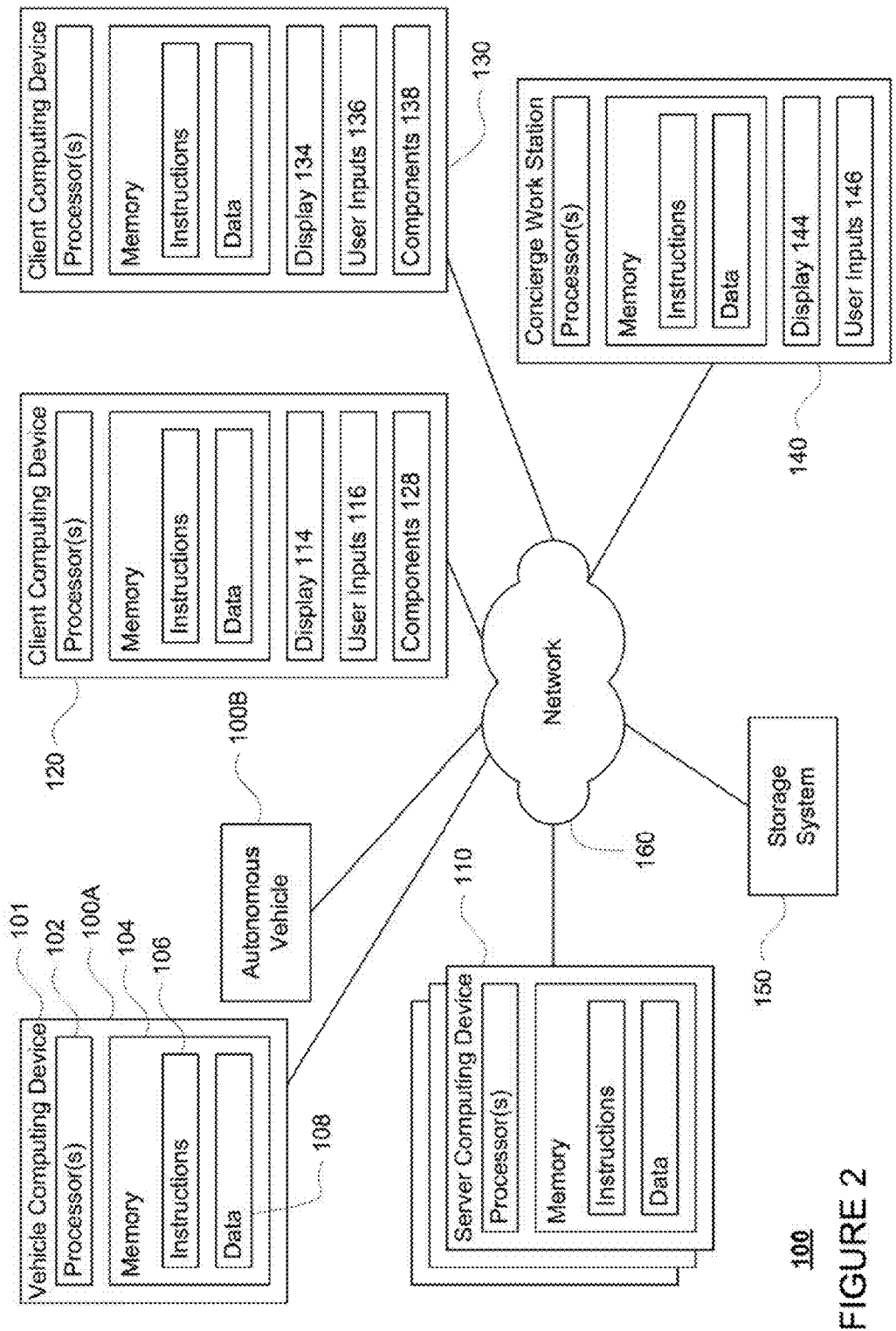
FIG. 2 is a functional diagram of the system of FIG. 1 in accordance with aspects of the disclosure.

As shown in FIGS. 1 and 2, a system 100 in accordance with one aspect of the disclosure includes various components such as vehicles 100A and 100B. While certain aspects of the disclosure are particularly useful in connection with specific types of vehicles, the vehicle may be any type of vehicle including, but not limited to, cars, trucks, motorcycles, busses, recreational vehicles, etc. The vehicles may have one or more computing devices, such as computing device 101 (shown in FIG. 2) containing one or more processors 102, memory 104, data 108, instructions 106 and other components typically present in vehicles having an autonomous driving mode. In this regard, computing device 101 may be an autonomous driving system that can control aspects of vehicle 100A in order to maneuver vehicle 100A for example, between pickup and destination locations. In addition vehicle 100B may be configured the same or similarly to vehicle 100A.

The memory 104 stores information accessible by the one or more processors 102, including instructions 106 and data 108 that may be executed or otherwise used by the processor 102. The memory 104 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 106 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 108 may be retrieved, stored or modified by processor 102 in accordance with the instructions 108 106. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 102 may be any conventional processors, such as commercially available CPUs. Alternatively, the one or more processors may be a dedicated device such as an ASIC or other hardware-based processor. Although FIG. 2 functionally illustrates the processor, memory, and other elements of the vehicle's computing device 101 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 101. Accordingly, references to a processor or computing device will be understood to include references to a collection of processors or computing devices or memories that may or may not operate in parallel.

Computing device 101 may include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information). In this example, the vehicle includes an internal electronic display as well as one or more speakers to provide information or audio visual experiences. In this regard, an internal electronic display may be located within a cabin of vehicle 100A and may be used by computing device 101 to provide information to passengers within the vehicle 100A.

Computing device 101 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing device 101 of vehicle 100A may also receive or transfer information to and from other computing devices. In this regard, system 100 also includes a plurality of computing devices 110, 120, 130, 140 and a storage system 150 connected via a network 160. As noted above, system 100 also includes vehicle 100B, which may be configured similarly to vehicle 100. Although only a few vehicles and computing devices are depicted for simplicity, a typical system may include significantly more.

As shown in FIG. 2, each of computing devices 110, 120, 130, 140 may include one or more processors, memory, data and instructions. Such processors, memories, data and instructions may be configured similarly to one or more processors 102, memory 104, data 108, and instructions 106 of computing device 101.

The network 160, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 110 may include one or more server computing devices that are capable of communicating with computing device 101 of vehicle 100A or a similar computing device of vehicle 100B as well as computing devices 120, 130, 140 via the network 160. For example, vehicles 100A and 100B may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 110 may use network 160 to transmit and present information to a user, such as user 122, 132, 142 (shown in FIG. 1) on a display, such as displays 114, 134, 144 of computing devices 120, 130, 140. In this regard, computing devices 120, 130, 140 may be considered client computing devices.

As shown in FIG. 1, each client computing device 120, 130, 140 may be a personal computing device intended for use by a user 122, 132, 142, and have all of the components normally used in connection with a personal computing device including one or more processors (e.g., a central processing unit (CPU)), memory (e.g., RAM and internal hard drives) storing data and instructions, a display such as displays 114, 134, 144 (e.g., a monitor having a screen, a touch-screen, a projector, a television, or other device that is operable to display information), and user input devices 116, 136, 146 (e.g., a mouse, keyboard, touch-screen or microphone). The client computing devices may also include a camera for recording video streams, speakers, a network interface device, and all of the components used for connecting these elements to one another.

In addition, the client computing devices 120 and 130 may also include components 128 and 138 for determining the position and orientation of client computing devices. For example, these components may include a GPS receiver to determine the device's latitude, longitude and/or altitude as well as an accelerometer, gyroscope or another direction/speed detection device.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, shown as a head-mounted computing system in FIG. 1. As an example the user may input information using a small keyboard, a keypad, microphone, using visual signals with a camera, or a touch screen.

In some examples, client computing device 140 may be a concierge work station used by an administrator to provide concierge services to users such as users 122 and 132. For example, a concierge 142 may use the concierge work station 140 to communicate via a telephone call or audio connection with users through their respective client computing devices or vehicles 100A or 100B in order to facilitate the safe operation of vehicles 100A and 100B and the safety of the users as described in further detail below. Although only a single concierge work station 140 is shown in FIGS. 1 and 2, any number of such work stations may be included in a typical system.

Storage system 150 may store various types of information as described in more detail below. This information may be retrieved or otherwise accessed by a server computing device, such as one or more server computing devices 110, in order to perform some or all of the features described herein. For example, the information may include routing data for generating and evaluating routes between locations. For example, the routing information may be used to estimate how long it would take a vehicle at a first location to reach a second location. In this regard, the routing information may include map information including roads, as well as information about roads such as direction (one way, two way, etc.), orientation (North, South, etc.), speed limits, as well as traffic information identifying expected traffic conditions, etc. The map information may also include buildings, elevations, fire hydrants, construction zones, real time traffic conditions, etc. from various sources such as governmental institutions, paid informational services, manually entered information, information gathered and provided in real time by autonomous vehicles, etc.

Figure 3:
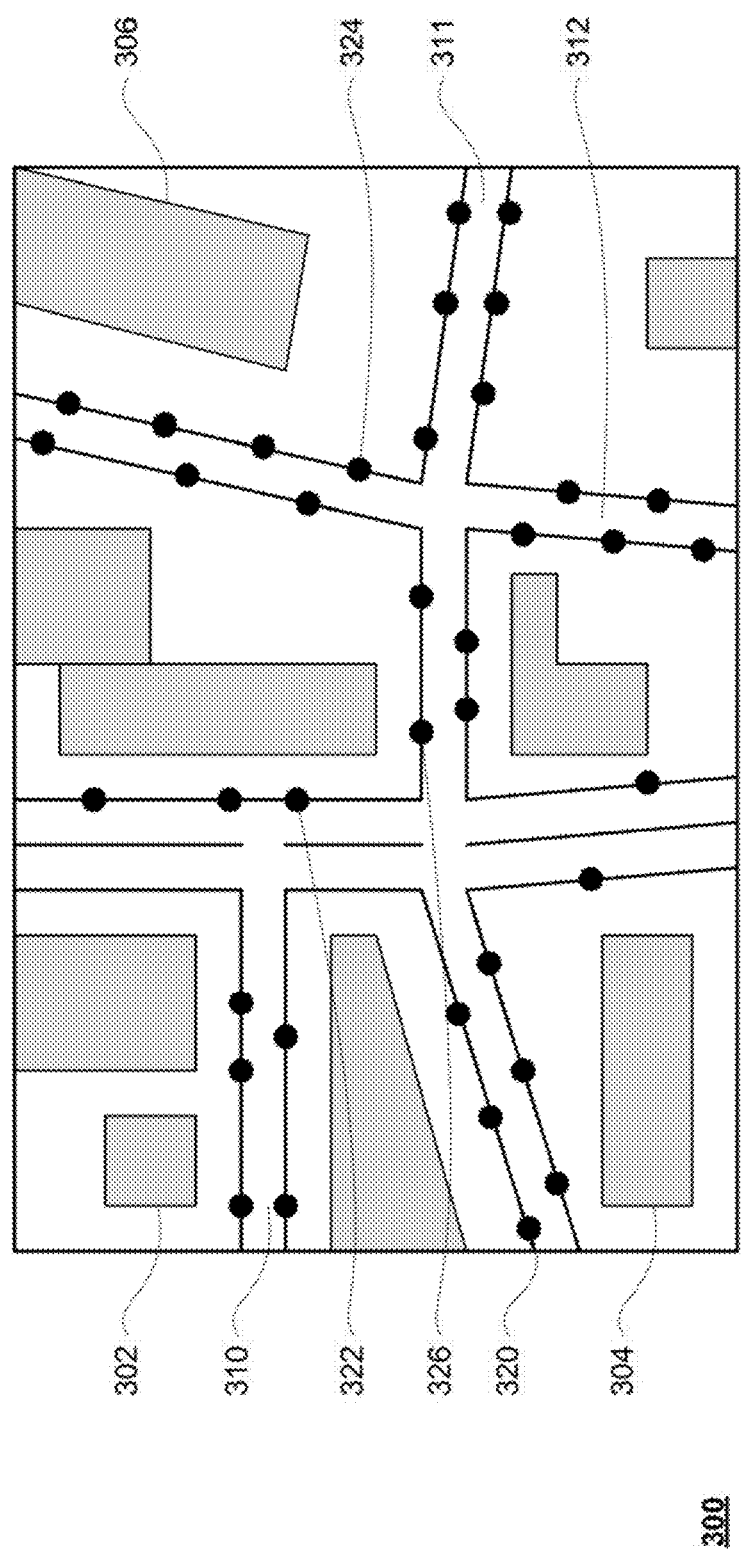
FIG. 3 is an example of detailed map information in accordance with aspects of the disclosure.

In some instances, the map information may include information identifying areas which have been preselected or preapproved for an autonomous vehicle to pick up a passenger (pickup location) or locations where the vehicle can wait for an additional passenger, stop and wait for a passenger to perform some task and return to the vehicle, or for the vehicle to drop off a passenger (destination location). For example, FIG. 3 is an example of map information 300 including a plurality of buildings 302-06 as well roadways 310-14. Map information 300 also include a number of points 320-326 identifying predetermined locations where an autonomous vehicle can park, stop and wait, load and unload passengers, etc. The predetermined locations may be manually selected or identified based on characteristics of such locations (sizes, shapes, parking and other laws, etc.) and, in some cases, manually verified. These predetermined locations may thus include reasonable locations where a vehicle could stop selected manually or through some analysis of the characteristics of each location. The predetermined locations may also be limited to locations within a service area of the autonomous vehicle service.

As with memory 104, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIGS. 1 and 2 and/or may be directly connected to or incorporated into any of the computing devices 110, 120, 130, 140, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 122 and 132 may download the application via a link in an email, directly from a website, or an application store to client computing devices 120 and 130. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 132 may use client computing device 130 to send a request to one or more server computing devices 110 for a vehicle. As part of this, the user may identify a pickup location, a destination location, and, in some cases, one or more intermediate stopping locations anywhere within a service area where a vehicle can stop.

Figure 4:
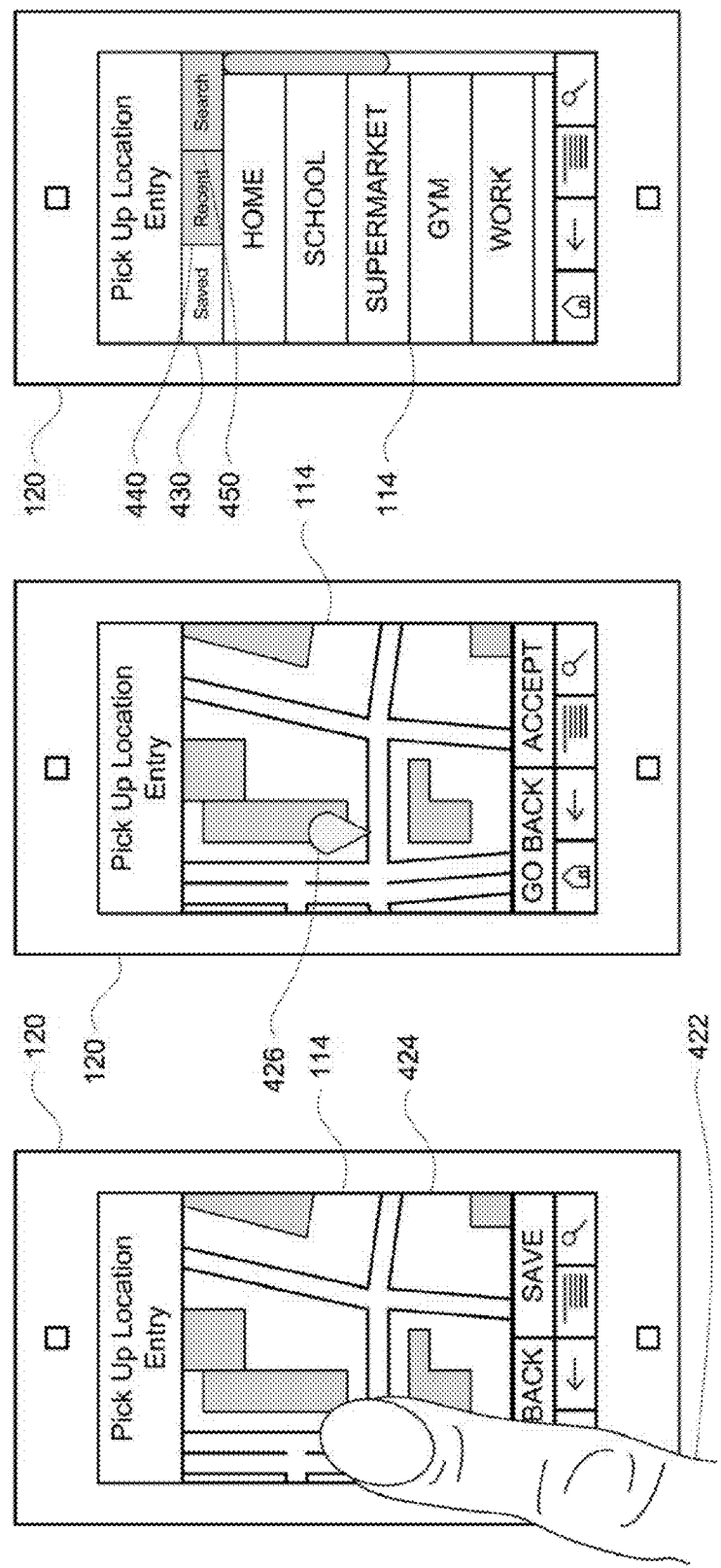
FIGS. 4A, 4B, and 4C are example client devices and screen shots in accordance with aspects of the disclosure.

These pickup and destination locations may be predefined (e.g., specific areas of a parking lot, etc.) or may simply be any location within a service area of the vehicles. As an example, a pickup location can be defaulted to current location of the user's client computing device, or can be input by the user at the user's client device. For instance, the user may enter an address or other location information or select a location on a map to select a pickup location. As shown in FIG. 4A, user 122 may use his or her finger 422 to tap on a map 424 displayed on the display 114 of client computing device 120. In response, as shown in FIG. 4B, the location of the tap on the map, displayed as map marker 426, may be identified as a requested location. Allowing the user to input or select a location may be especially helpful where the user is not currently located at the pickup location but will be by the time the vehicle arrives.

In the example of FIG. 4C, a user is provided with a plurality of options for inputting locations. As shown, the user is able to select from a series of saved locations under a saved option 430 previously saved by the user as discussed above. The user may also be provided with option 440 which provide the user with the ability to view a list of recent locations. By selecting option 450, the user may be able to conduct a location search. For example, a user may enter a search query ("fast food restaurant" or "doctor doe" or "gas station near me") and receive a set of locations corresponding to the search query as with a typical map or location-based search engine.

Once the user has selected one or more of a pickup and/or destination locations, the user's client computing device may send the location or locations to one or more server computing devices of the centralized dispatching system. In response, the one or more server computing devices may provide one or more suggested locations corresponding to each received location.

Figure 5:
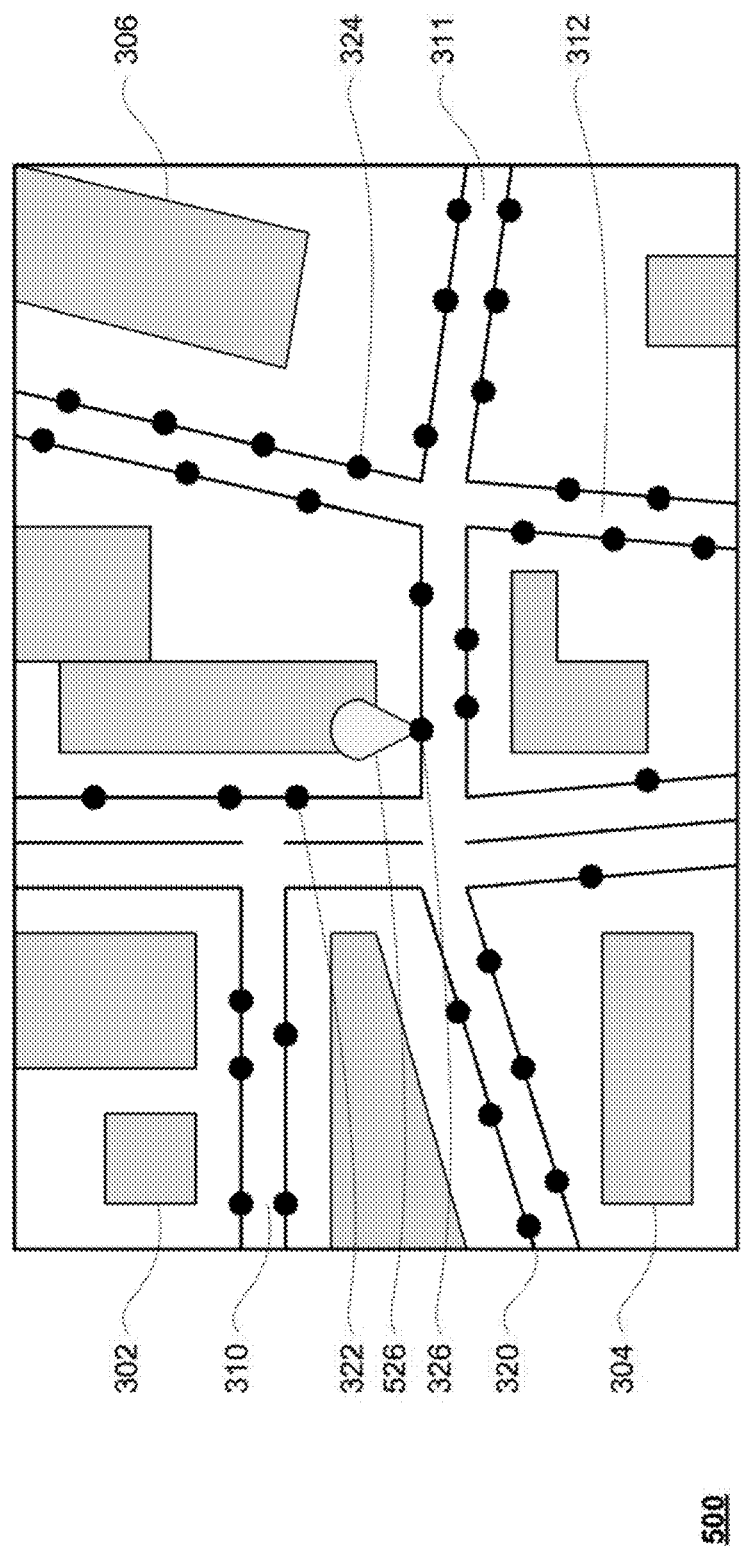
FIG. 5 is another example of detailed map information and requested pickup location in accordance with aspects of the disclosure.

In order to provide a suggested location in response to a received location, the one or more server computing devices may access the map information of storage system 150 to determine whether the received location corresponds to one of the predetermined locations for picking up or dropping off passengers. If so, the one or more server computing devices may determine that the received location is in fact reachable. For example, as shown in example 500 of FIG. 5, the location of map marker 426 on map 426 corresponds to the location of map marker 526 in FIG. 5. This location also at least partially overlaps with or is the same as the location of point 326. In this regard, the location of map marker 426 (and the finger tap of FIG. 4A) corresponds to the predetermined location of point 326.

Figure 6:
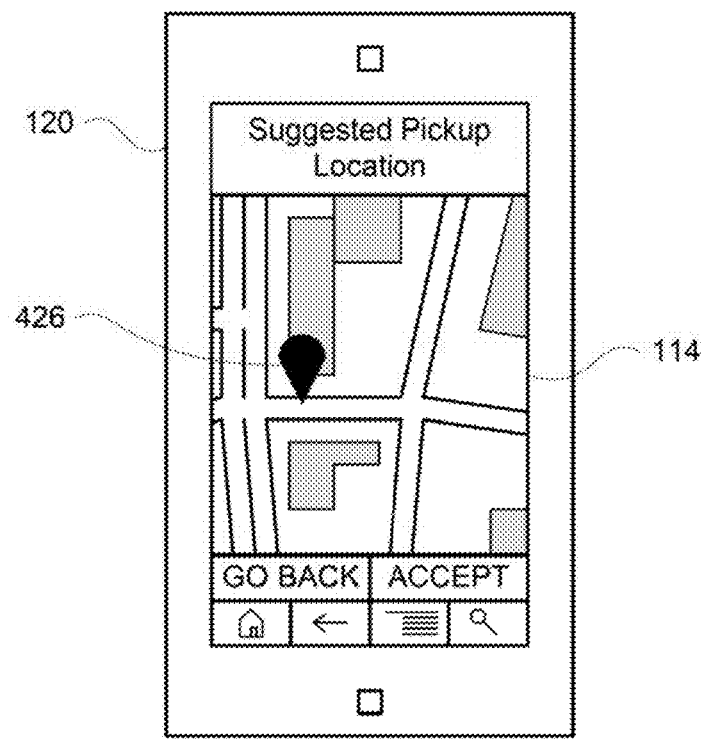
FIG. 6 is another example client device and screen shot in accordance with aspects of the disclosure.

When a requested location does correspond to one of the predetermined locations, the one or more server computing devices may provide a notification to the client computing device including a suggested location corresponding to the received location. For example, in response to receiving the location of map marker 426 and determining that this received location corresponds to the predetermined location of point 326, the one or more server computing devices 110 provide a notification to client computing device 120 suggesting the location of map marker 426 as a suggested location for a passenger pickup or destination location, depending upon the nature of the requested location. As shown in FIG. 6, map marker 426 is now highlighted to indicate that the location of map marker 426 is a suggested location returned from the one or more server computing devices 110. The user may then select the returned suggested location as a pick up or destination location. If the location is a pickup location, the server may then dispatch a vehicle, such as vehicle 100A or vehicle 100B, to the selected location to pick up the user for a trip. If the location is a destination location, the server may provide the selected location to the vehicle, with instructions to maneuver the vehicle to the selected location with the passenger and drop off a passenger or wait as the case may be.

When the received location does not correspond to one of the predetermined locations, the one or more server computing devices may use the detailed map information to identify one or more other suggested locations. This set of suggested locations may then be provided to the client computing device that sent the received location.

For example, the one or more server computing devices 110 may identify set of predetermined locations within a threshold distance of the received location. The threshold distance may be defined as a predetermined radial distance from the received location and may also be adjusted (increased or decreased) by a user, for example, by providing the one or more server computing devices 110 with a user preference. For example, a user may then use his or her client computing device to adjust this value up or down and any adjustments may be provided to the one or more server computing devices by the user's client computing device.

Figure 7:
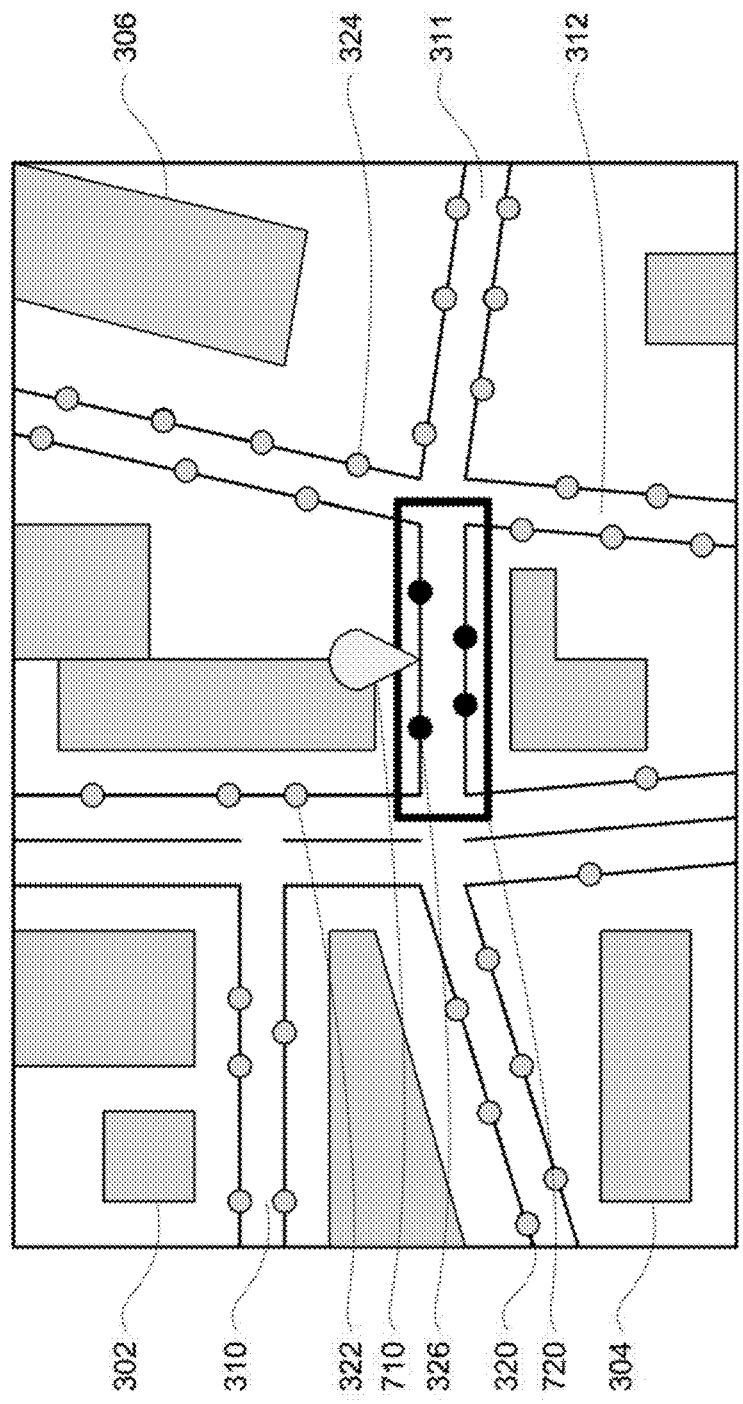
FIG. 7 is an example of detailed map information and data in accordance with aspects of the disclosure.

In one example, a default threshold distance may be 500 feet, or more or less, radially or in walking distance from a received location. In other words, the threshold may be used to draw an area around a received location from a client computing device and identify the set or suggested locations. For example, as shown in FIG. 7, map marker 710 identifies a received location from a client computing device. Area 720 may define areas that are within a 500 foot walking distance of map marker 710. In some instances, this area may be limited to areas within a roadway where a vehicle can actually travel. Thus, point 326 may be included in the set of suggested locations while points 320-24 are not.

Figure 8:
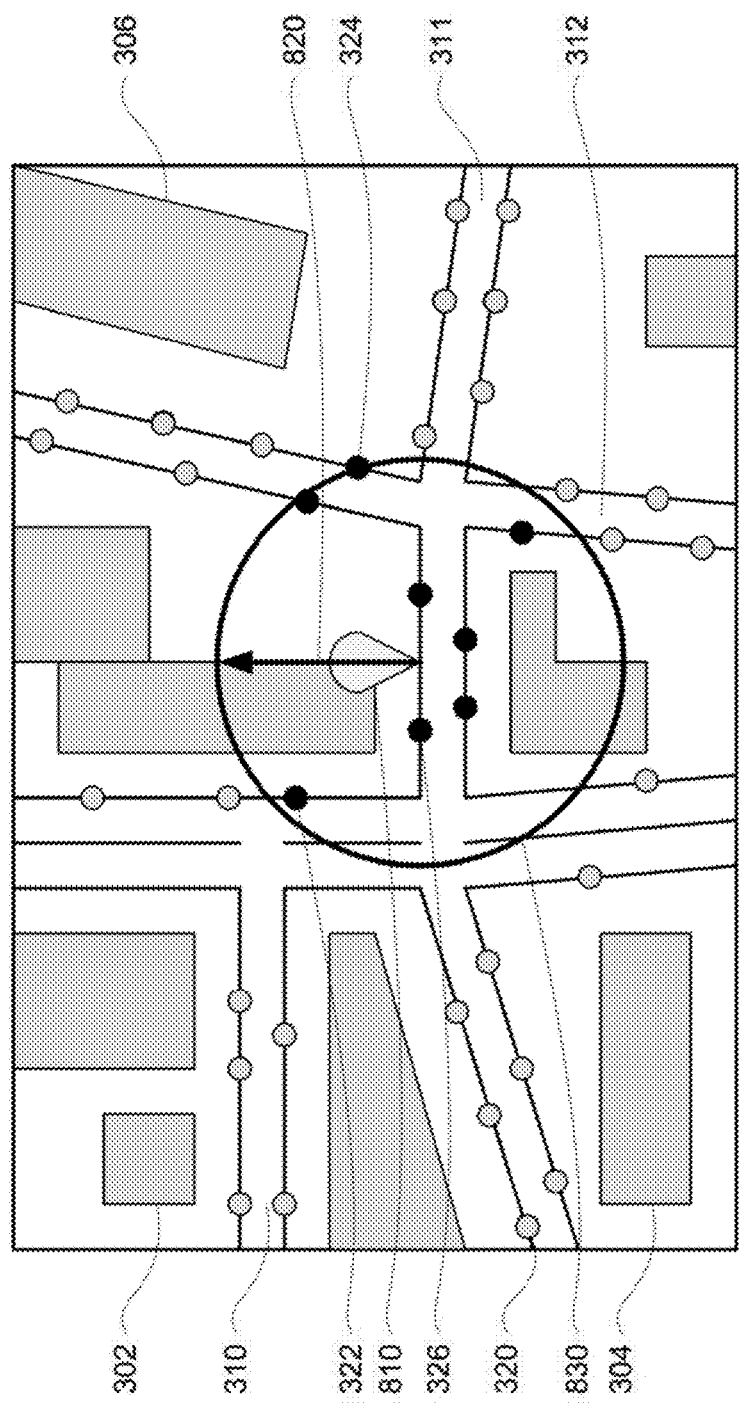
FIG. 8 is another example of detailed map information and data in accordance with aspects of the disclosure.

As shown in example 800 of FIG. 8, map marker 810 identifies a received location from a client computing device. The one or more server computing devices 110 may then identify a set of suggested locations including any predetermined locations within radius 820 of map marker 810 or any predetermined locations within circle 830. In FIG. 8, points having locations within the set of suggested locations are shown as darkened circles and those not included have only a dark outline. Thus, points 322, 324, and 326 are identified as being within circle 830 while point 320 is not.

Figure 9:
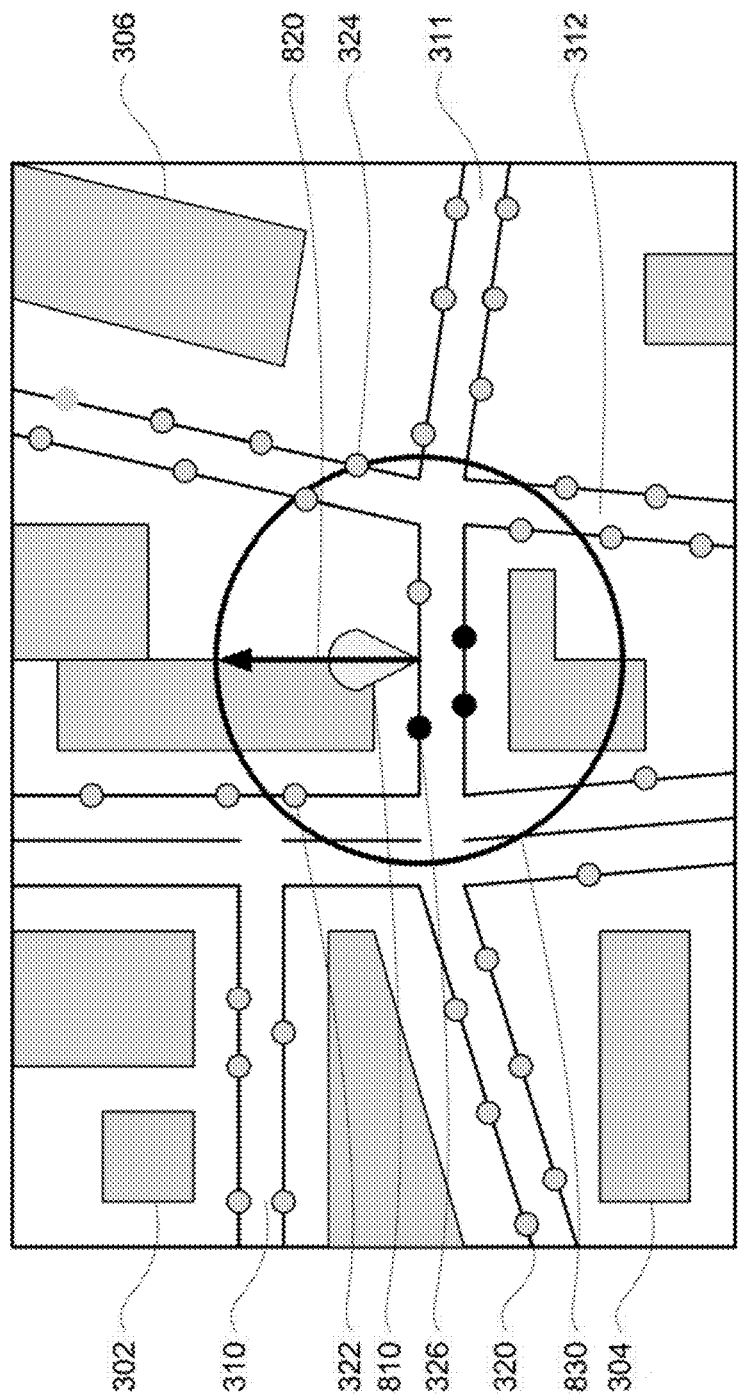
FIG. 9 is a further example of detailed map information and data in accordance with aspects of the disclosure.

The set of suggested locations may include all of the predetermined locations within the threshold distance, as shown in FIGS. 7 and 8. Alternatively, the set may include one or more predetermined locations that are closest to the received location, up to some maximum value, such as 3 or more or less, within the threshold distance. For example, as shown in FIG. 9, points having locations within the set of suggested locations are shown as darkened circles and those not included have only a dark outline. Thus, while radius 820 and circle 830 identify a plurality of points, points 322 and 324 are not ones of the 3 closest to the map marker 810. In this regard, the locations of points 322 and 324 may be filtered from or not included in the set of suggested locations. At the same time, the location of point 326 is one of the 3 closest points to map marker 810. Thus, the location of point 326 may be included in the set of suggested locations.

The set of suggested locations may then be provided to the client computing devices. As with the example above, a user may then select or reject any suggested location as either a pick up or destination location, depending upon the nature of the received location. If the location is a pickup location, the server may then dispatch a vehicle, such as vehicle 100A or vehicle 100B, to the selected location to pick up the user for a trip. If the location is a destination location, the server may provide the selected location to the vehicle, with instructions to maneuver the vehicle to the selected location with the passenger and drop off a passenger or wait as the case may be.

Figures 10A, 10B:
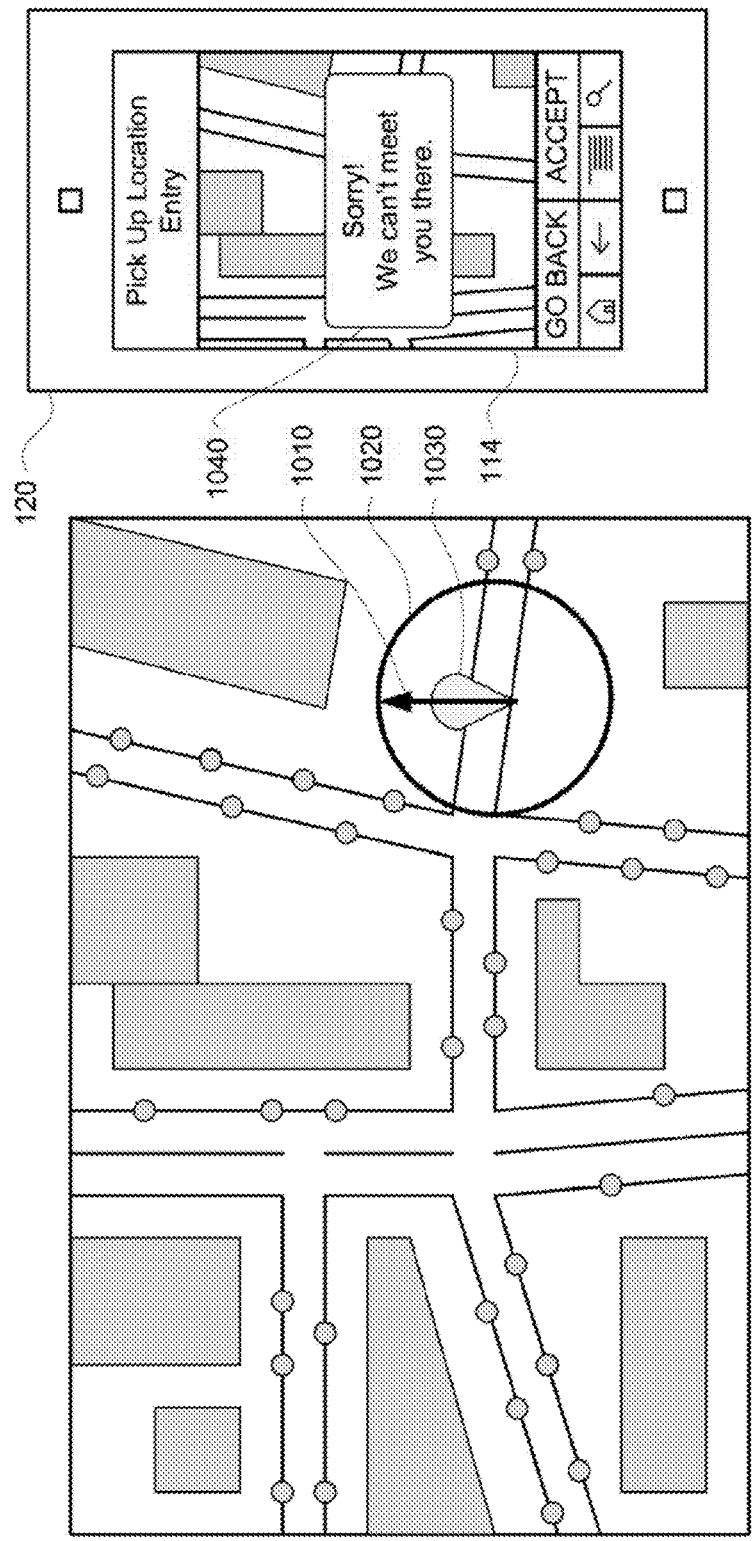
FIG. 10A is an example of detailed map information and data in accordance with aspects of the disclosure.
FIG. 10B is an example client device and screen shot in accordance with aspects of the disclosure.

In some examples, the set of suggested locations may be empty, so the one or more server computing devices do not have any suggested locations to provide in response to a received location from a client computing device. For example, as shown in FIG. 10A, there are no points within radius 1010 or circle 1020 of the location of map marker 1030 corresponding to a received location. Thus, the set of suggested locations is empty.

Rather than simply sending the empty set of suggested locations to the client computing device, the one or more server computing device 110 may provide the client computing device with a notification indicating that the received location is not available. FIG. 10B is an example of a notification 1040 received by the client computing device 120 and displayed on the display 114 to indicate that a received location is unavailable.

In one example, rather than returning all of the predetermined locations in the set, one or more predetermined locations may be selected for and returned as a set of suggested locations to the user. For example, each predetermined location within the set may be scored using various factors and the one or more highest (or lowest depending upon scale) scoring locations may be returned as suggested locations to the user.

The scoring may be based on various factors that quantify the ease and/or difficulty of reaching the predetermined location by one or both of an autonomous vehicle and the user. Factors related to an autonomous vehicle may include, for example, the location of any autonomous vehicles available to pick up the user (if a pickup location), whether the vehicle would have to first pass the location (on the opposite side of the street) and turn around, whether the autonomous vehicle can currently reach the predetermined location (because access is temporarily prevented due to traffic or construction conditions), the availability of parking or places to pull over and wait at the predetermined location, as well as any other such factors. Factors related to the user may include, for example, the distance from the received location to the predetermined location, the availability and size of sidewalks, the presence and grade of hills, the number and size of roads that would need to be crossed from the received location to the predetermined location, or any other characteristics of roads that would affect the ease of walking to the suggested location. In one instance, each factor may be individually scored for a given predetermined location and the scores summed to provide an overall score for that given predetermined location.

The scoring may be especially useful situations in which a predetermined location very close to the received location is somehow less desirable than another predetermined location farther away. For example, if a predetermined location on one side of a highway is closer in distance to a received location, but because of the difficulty involved in walking there from the received location, the scoring may identify another predetermined location that is farther away from the received location but easier to reach by walking.

Figure 11:
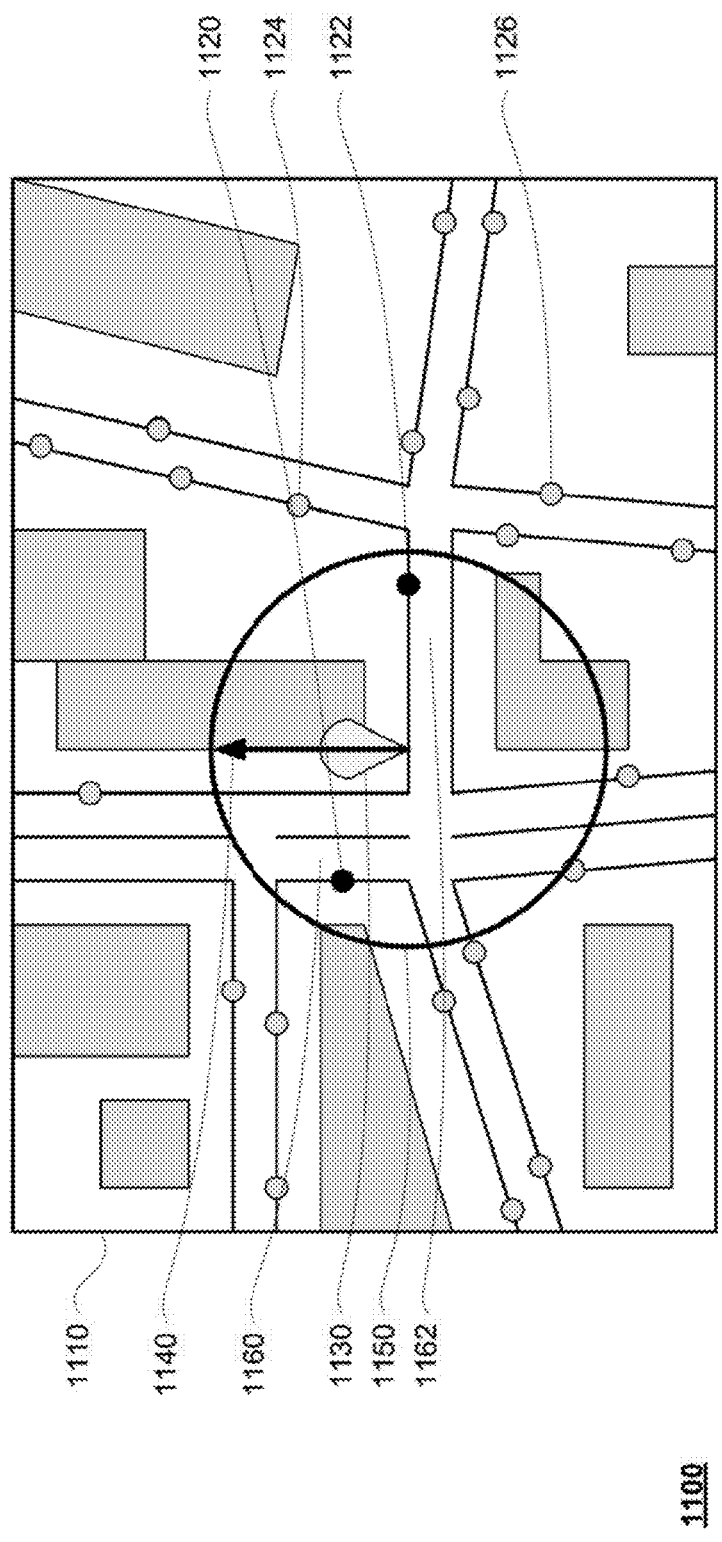
FIG. 11 is another example of detailed map information and data in accordance with aspects of the disclosure.

For example, FIG. 11 is an example 1100 of map information 1110 including a plurality of points 1120-1126 identifying predetermined locations as discussed above. Map marker 1130 represents a received location from a client computing device. Radius 1140 and circle 1150 represent a threshold distance from the location of map marker 1130 that identify point 1120 and 1122 as being within a set of suggested locations. Each of points 1120 and 1122 may be scored. In one example, although point 1122 is farther away from the location of map marker 1130 than point 1120, point 1122 may have a higher score than point 1120. For instance, point 1120 may require a person to cross road 1160 which may be a highway or typically busy area in terms of traffic, whereas point 1122, though farther away from map marker 1130 does not require a person to cross any roads and is on the same side of road 1162 as the location of map marker 1130.

In an alternative, rather than returning a received location as a suggested location if the received location corresponds to a predetermined location, the one or more server computing devices may simply include the predetermined location that corresponds to the received location in a set of predetermined locations (the rest of the predetermined locations in the set being determined using a threshold distance as described above). In this example, the received location may be scored along with the other predetermined locations in the set in order to select the best location or locations to provide as suggestions to a user as discussed above.

Although the examples discussed above relate to a user initiating a trip by providing a pick up and one or more destination locations, the features described above may be used to identify and suggest destination locations for a dropping off of a user during a trip. This may be especially useful where a problem arises with a destination location which was previously approved by a user. In one example, the problem may be that the vehicle is no longer able to reach the destination location. This information may be provided to the vehicle's computing device by way of traffic condition updates received, for example, from the one or more server computing device or a traffic condition service.

In another example, if there is some type of hazard at the destination location where the vehicle would drop off a user, the features described above may be used to provide a user with an alternative destination to drop off the user. Hazards may include pot holes, puddles, slippery ground, objects on top of the ground that would make for uneven footing, cracks in the pavement, uneven ground, high curbs, storm drains, broken glass, etc. For example, various sensors of the vehicle, including lasers, radar, sonar, etc., may provide data regarding the ground next to the vehicle. This data may be used to detect any hazards near the vehicle, using computer vision algorithms and the computing device 101. If a hazard is detected the user may be provided with a new suggested destination or destinations. This new suggested destination may be selected as discussed above by the vehicle's computing device 101 or by the vehicle's computing device 101 requesting such information from the one or more server computing devices 110.

In addition to or instead of providing a new suggested destination or destinations, the vehicle may provide the user with an alert to warn him or her of the hazard. Alerts may take any number of forms including displaying a message on an internal screen, an audible message from a speaker inside of the vehicle, or a notification sent to a smart phone program being used to interact with the vehicle.

As discussed above, the number of suggested locations provided to the user may be a default value such as zero or one or more or less. Alternatively, the number of suggested locations may be set by a user and provided to the one or more server computing devices. In yet another alternative, the number of suggested locations provided may be determined by selecting any of the predetermined locations of the set having at least a particular score.

Figure 12:
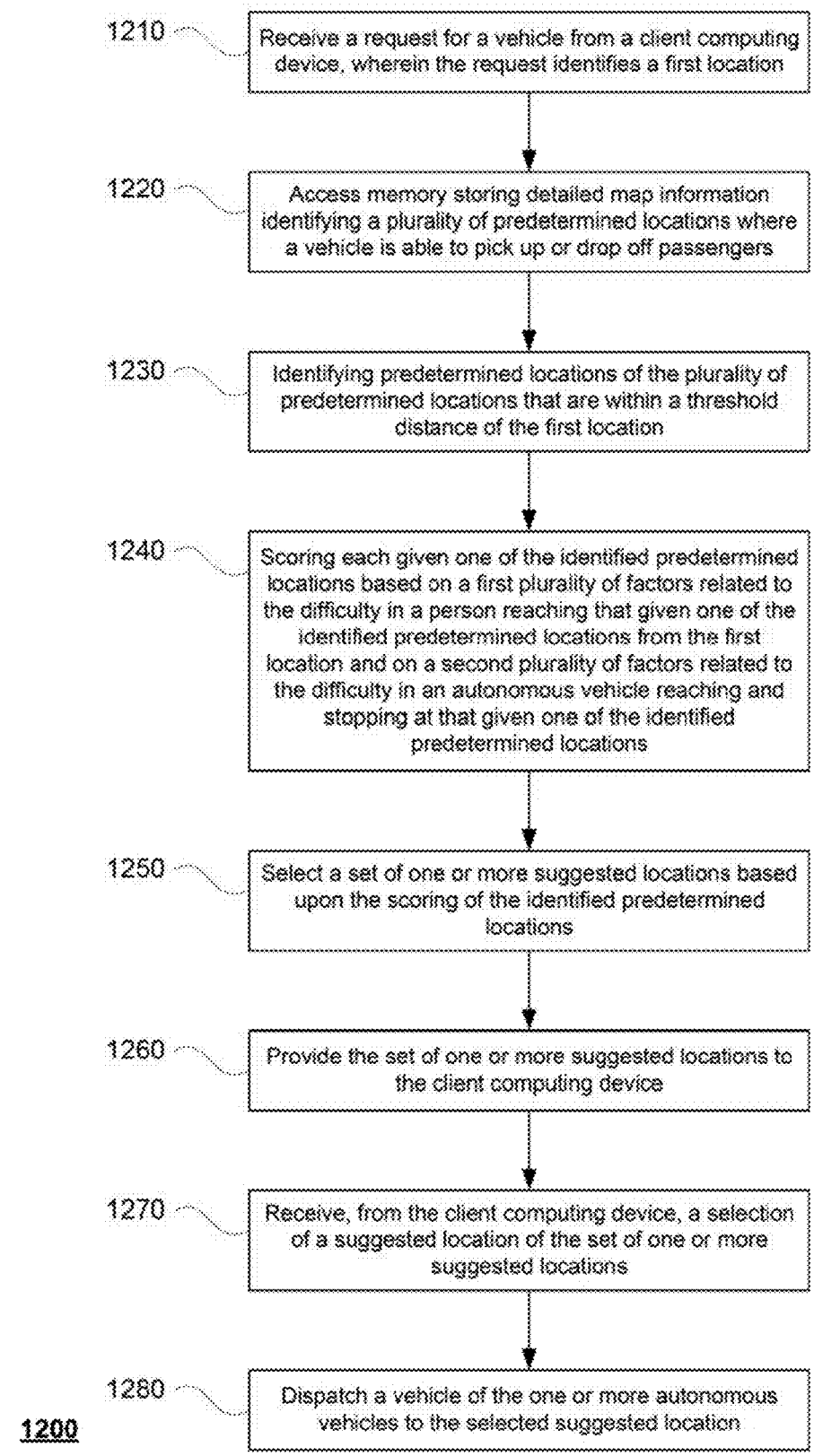
FIG. 12 is an example flow diagram in accordance with aspects of the disclosure.

FIG. 12 is an example flow diagram 1200 in accordance with some of the aspects described above that may be performed by one or more computing devices such as the one or more server computing devices 110. For example, at block 1210, a request for a vehicle is received from a client computing device, wherein the request identifies a first location. Memory storing detailed map information identifying a plurality of predetermined locations where a vehicle is able to pick up or drop off passengers is accessed at block 1220. Predetermined locations of the plurality of predetermined locations that are within a threshold distance of the first location are determined at block 1230. Each given one of the identified predetermined locations is scored based on a first plurality of factors at block 1240. The plurality of factors are related to the difficulty in a person reaching that given one of the identified predetermined locations from the first location and on a second plurality of factors related to the difficulty in an autonomous vehicle reaching and stopping at that given one of the identified predetermined locations. A set of one or more suggested locations is selected based upon the scoring of the identified predetermined locations at block 1250. The set of one or more suggested locations is provided to the client computing device at block 1260. A selection of a suggested location of the set of one or more suggested locations is received at block 1270. A vehicle of the one or more autonomous vehicles is dispatched to the selected suggested location at block 1280.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
memory storing detailed map information identifying a plurality of predetermined locations where a vehicle is able to pick up or drop off passengers; and
one or more server computers each having one or more processors, the one or more server computers being configured to:
receive a request from a client computing device, the request identifying a first location;
select a set of one or more suggested locations by comparing the plurality of predetermined locations to the first location;
determining whether the first location corresponds to a predetermined location of the plurality of predetermined locations; and
when the first location corresponds to the predetermined location of the plurality of predetermined locations, including the predetermined location in the set; and
provide the set of one or more suggested locations to the client computing device,
wherein when the first location is a destination location, the one or more server computers are further configured to provide instructions to a vehicle to drop off a passenger at the first location and
wherein when the first location is a pick up location, the one or more server computers are further configured to dispatch a vehicle to the first location.

2. The system of claim 1, wherein the one or more server computers are configured to select the set of one or more suggested locations by identifying predetermined locations of the plurality of predetermined locations that are within a threshold distance of the first location.

3. The system of claim 2, wherein the threshold distance is defined as a walking distance.

4. The system of claim 2, wherein the threshold distance is defined as a radial distance.

5. The system of claim 2, wherein the one or more server computers are configured to select the set of one or more suggested locations by:
scoring each given one of the identified predetermined locations based on a first plurality of factors related to the difficulty in a person reaching the given one of the identified predetermined locations from the first location; and
wherein the set of one or more suggested locations is further selected based upon the scoring of the identified predetermined locations.

6. The system of claim 1, wherein the one or more server computers are configured to conduct the scoring of each given one of the identified predetermined locations further based on a second plurality of factors related to the difficulty in an autonomous vehicle reaching and stopping at that given one of the identified predetermined locations.

7. The system of claim 6, wherein the one or more server computers are further configured to determine at least one of the second plurality of factors based on a current location of the autonomous vehicle.

8. The system of claim 1, wherein the one or more server computers are configured to select the set of one or more suggested locations by identifying a set number of predetermined locations of the plurality of predetermined locations that are within a threshold distance of the first location and closest to the first location.

9. The system of claim 8, further comprising one or more autonomous vehicles, and wherein the one or more server computers are further configured to:
receive, from the client computing device, a selection of a suggested location of the set of one or more suggested locations; and
dispatch a vehicle of the one or more autonomous vehicles to the selected suggested location.

10. The system of claim 1, wherein the first location is the destination location and the one or more server computing devices are further configured to:
receive, from the client computing device, information confirming the first location as the destination location.

11. The system of claim 1, wherein the first location is the pick up location and the one or more server computing devices are further configured to:
receive, from the client computing device, information confirming the first location as the pickup location.

12. The system of claim 1, wherein the first location corresponds with the predetermined location of the plurality of predetermined locations by partially overlapping with or being at a same location as the predetermined location of the plurality of predetermined locations.

13. A computer-implemented method comprising:
accessing, by one or more processors of one or more server computing devices, detailed map information identifying a plurality of predetermined locations where a vehicle is able to pick up or drop off passengers;
receiving, by the one or more processors, a request from a client computing device, the request identifying a first location;
selecting, by the one or more processors, a set of one or more suggested locations by
comparing the plurality of predetermined locations to the first location and identifying predetermined locations of the plurality of predetermined locations that are within a threshold distance of the first location and closest to the first location,
determining whether the first location corresponds to a predetermined location of the plurality of predetermined locations; and
when the first location corresponds to the predetermined location of the plurality of predetermined locations, including the predetermined location in the set; and
providing, by the one or more processors, the set of one or more suggested locations to the client computing device,
wherein when the first location is a destination location, providing by the one or more processors, instructions to a vehicle to drop off a passenger at the first location, and
wherein when the first location is a pick up location, dispatching by the one or more processors, a vehicle to the first location.

14. The method of claim 13, wherein selecting the set includes selecting a predetermined number of predetermined locations of the plurality of predetermined locations that are within a threshold distance of the first location and closest to the first location.

15. The method of claim 13, wherein the threshold distance is defined as a walking distance.

16. The method of claim 13, wherein the threshold distance is defined as a radial distance.

17. The method of claim 13, wherein selecting the set of one or more suggested locations includes:
scoring each given one of the identified predetermined locations based on a first plurality of factors related to the difficulty in a person reaching that given one of the identified predetermined locations from the first location; and
using the scoring of the identified predetermined locations to select the set of one or more suggested locations.

18. The method of claim 17, wherein the scoring of each given one of the identified predetermined locations is conducted based on a second plurality of factors related to the difficulty in an autonomous vehicle reaching and stopping at that given one of the identified predetermined locations.

19. The method of claim 13, wherein the first location corresponds with the predetermined location of the plurality of predetermined locations by partially overlapping or being at a same location as the predetermined location of the plurality of predetermined locations.

20. A non-transitory, tangible, computer readable medium on which instructions are stored, the instructions, when executed by one or more processors, cause the one or more processors to perform a method, the method comprising:
accessing detailed map information identifying a plurality of predetermined locations where a vehicle is able to pick up or drop off passengers;
receiving a request from a client computing device, the request identifying a first location;
selecting a set of one or more suggested locations by
comparing the plurality of predetermined locations to the first location;
determining whether the first location corresponds to a predetermined location of the plurality of locations; and
when the first location corresponds to the predetermined location of the plurality of predetermined locations, including the predetermined location in the set;
scoring given ones of the plurality predetermined locations based on a first plurality of factors related to the difficulty in a person reaching a respective given one of the identified predetermined locations from the first location;
providing the set of one or more suggested locations to the client computing device;
wherein when the first location is a destination location, providing instructions to a vehicle to drop off a passenger at the first location, and
wherein when the first location is a pick up location, dispatching a vehicle to the first location.

* * * * *